H. CUSTER.
FILLING DEVICE AND INDICATOR.
APPLICATION FILED APR. 2, 1920.
1,420,624.
Patented June 27, 1922.
2 SHEETS—SHEET 2.
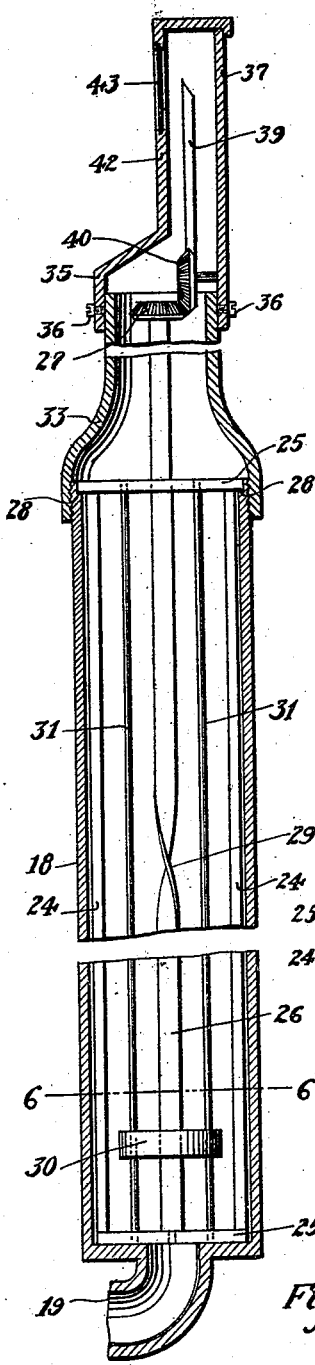
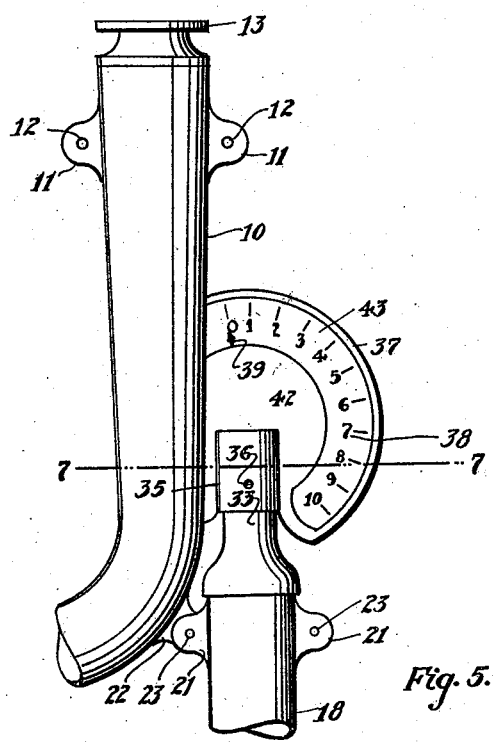
Fig. 5.
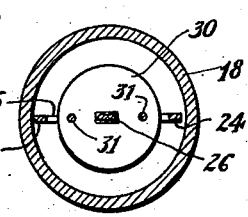
Fig. 6.
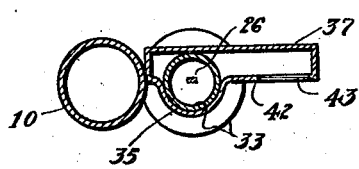
Fig. 7.
Fig. 4.
Herman Custer,
INVENTOR
BY Victor J. Evans
ATTORNEY
WITNESS:

UNITED STATES PATENT OFFICE.

HERMAN CUSTER, OF STOYESTOWN, PENNSYLVANIA, ASSIGNOR TO CUSTER MANUFACTURING COMPANY, OF STOYESTOWN, PENNSYLVANIA, A CORPORATION OF PENNSYLVANIA.

FILLING DEVICE AND INDICATOR.

1,420,624.  Specification of Letters Patent.  Patented June 27, 1922.

Application filed April 2, 1920. Serial No. 370,894.

*To all whom it may concern:*

Be it known that I, HERMAN CUSTER, a citizen of the United States, residing at Stoyestown, in the county of Somerset and State of Pennsylvania, have invented new and useful Improvements in Filling Devices and Indicators, of which the following is a specification.

This invention comprehends the provision of a fuel or tank attachment for motor vehicles, and has a particular application to vehicles wherein the fuel tank is arranged beneath the front seat. In such instances, when it is desired to supply the tank with fuel, it is necessary that the occupant of the front seat leave the car, subsequent to which the cushion of the seat must then be removed, and the top which controls access to the tank must be removed from the latter. It is often times necessary to make use of pliers or an analogous tool to unscrew the top from the tank, all of this requiring time, in addition to which the operator or occupant of the car is subjected to the trouble and inconvenience which is more aggravated in inclement weather. Again, in order to determine the quantity of fuel contained in the tank, a rule or strip of an appreciable length must be inserted into the tank. By reason of this fact, particles of dirt or other foreign matter often gain access to the said tank, causing considerable trouble and waste of time by clogging or stopping up the feed line, from the tank to the motor.

It is therefore the object of this invention to provide a combined filling and indicator attachment for the fuel tank, so constructed and disposed with relation to the front seat of the vehicle, that the attendant of a fuel and supply station can readily and easily fill the tank with fuel, without requiring the occupant of the front seat leaving the car, the indicating means being in full view of the operator occupying his position within the car, so that he can readily determine the exact quantity of fuel with which the tank has been supplied.

The nature and advantages of the invention will be better understood when the following detailed description is taken in connection with the accompanying drawings, the invention residing in the construction, combination and arrangement of points as claimed.

In the drawings forming part of this application, like numerals of reference indicate similar parts in the several views, wherein:—

Figure 4 is a longitudinal sectional view taken through the indicating tube with its associated parts.

Figure 5 is an enlarged fragmentary view of the upper end of the indicating tube showing the association of the indicator pipe and its component parts with the tube.

Figure 6 is a transverse sectional view taken on line 6—6 of Figure 4.

Figure 7 is a similar view taken on line 7—7 of Figure 5.

Figure 1:
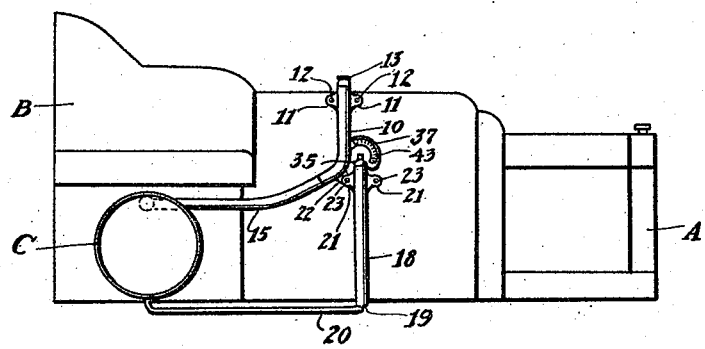
Figure 1 is a side elevation of the front part of a motor vehicle showing the general arrangement of the invention and its association with the fuel tank.
Figure 2:
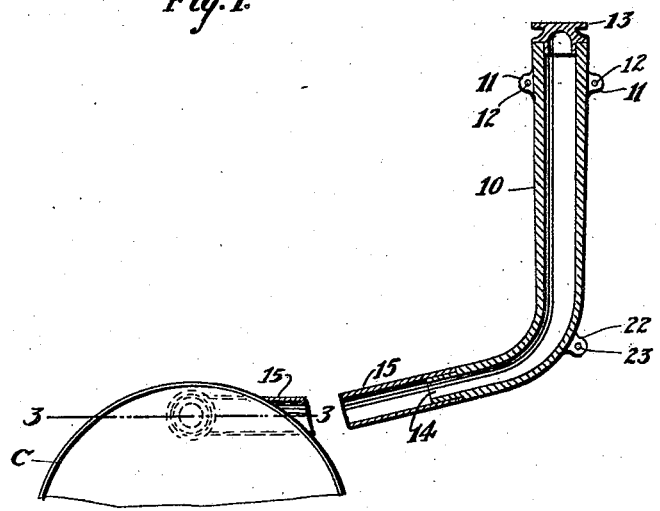
Figure 2 is an enlarged view of the invention showing part of the fuel tank, and the filling tube in section and associated with the tank.
Figure 3:
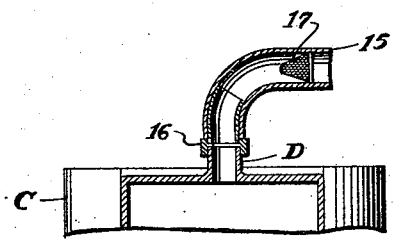
Figure 3 is a sectional view taken on the line 3—3 of Figure 2.

Referring to the drawings in detail, A indicates generally a part of a motor vehicle, B the front seat thereof, beneath which is arranged the fuel tank C. The tank is provided with the usual neck D.

The attachment forming the subject matter of my invention includes a filling tube and indicator, which parts are arranged in juxtaposition adapted to be suitably secured to the side of the motor vehicle A in the manner illustrated in Figure 1. For the purpose of illustration, the tube 10 is herein shown as being substantially of L-shaped formation, the main body portion of which is vertically disposed and provided with attaching lugs 11 for the reception of suitable fastening elements 12 through the instrumentality of which the tube is secured to the side of the vehicle A. The tube projects a slight distance above the upper edge of the side of the car to which it is attached, so that the cap 13 which closed the tube normally, can be conveniently and easily removed to permit the end of a supply pipe to be inserted in the tube 10 as will be readily understood. The lower end of the tube 10 is reduced as at 14 and is fitted within a flexible hose 15, the outer end of which is clamped to the neck D of the fuel tank by means of the fastening device 16. Arranged within the flexible hose 15 is a strainer 17 to prevent dirt or other foreign matter gaining access to the tank C.

Arranged substantially parallel to the main body portion 10 of the filling tube is a tube 18 in which is arranged the mechanism of the indicator by means of which the quantity of fuel with which the tank C is supplied may be readily and easily determined. This tube 18 is provided with a reduced lower extremity 19, with which one end of the pipe 20 is connected, this pipe leading from the tank C and obviously establishing communication between the tank and the indicator. The tube 18 is provided with attaching lugs 21, one of which overlies a similar lug 22 projecting from the filling tube 10, so that when the fastening elements 23 are passed through these lugs, the filling tube and the indicator as a unit are fixed to the side of the vehicle A. Disposed within the tube 18 is a frame having vertically disposed members 24, connected by transverse members 25 at the top and bottom thereof. A float actuated rod 26 is arranged centrally in the tube 18 and journaled upon the frame therein, this rod projecting an appreciable distance beyond one end of the tube 18, supporting a bevel gear 27. The tube 18 is provided at its upper end with diametrically opposed notches 28 which receive the extremities of the adjacent transverse member 25. The rod 26 is twisted as at 29 for a portion of its length, so that when the float 30 rises on the rod 26, rotary motion will be imparted to the rod 26 as will be readily understood. Terminally connected with reversed members 25 are guide rods 31 for the float 30, these rods being in parellelism with the rod 26 and arranged at opposite sides of the latter. A hollow cylindrical cap having an enlarged lower portion is herein indicated at 33, and screwed or otherwise secured to the adjacent end of the tube 18, completely enclosing the projected end of the rod 26 and the beveled edge gear 27. A sleeve-like member 35 is fitted upon the cap 33 and secured thereto in fixed relation by means of set screws or the like 36. This sleeve like member supports the dial plate 37 which is suitably graduated as at 38, while pivoted upon the plate is a pointer 39. The lower end of the dial plate 37 supports a beveled gear 40, which meshes with the gear 27, and consequently when the rod 26 is rotated, pivotal movement is imparted to the pointer 39. At 42 I have indicated a casing carried by the sleeve-like member 35, this casing serving to enclose the pointer 39. The casing is provided with a transparent portion 43 so that the operator may readily and easily read the indicator from his position in the car.

In practice, when it is desired to supply the tank C with fuel, it is only necessary for the cap 13 to be removed from the filling tube 10 after which the supply pipe is inserted into the tube 10. The fuel flows through the tube 10 into the tank C passing through the strainer at 17 to prevent dirt and other foreign matter gaining access to the tank. As the level of the fuel within the tank rises, the float 30 is moved upwardly upon the rod 26, thus imparting rotary movement to the latter. As the gear 27 is rotated, it imparts pivotal movement to the pointer 39, the latter co-operating with the graduated plate 37 to determine the quantity of fuel admitted to the tank C. By reason of the transparency of the portion 43 of the dial casing, the indicator can be read by the operator from his seat in the car. Both the filling tube and indicator are so disposed relatively, that they can be readily and easily secured to the side of the car body as shown in Figure 1.

While it is believed from the foregoing description the nature and advantages of the invention will be readily apparent, I desire to have it understood that I do not limit myself to the details shown, and that such changes may be resorted to when desired as fall within the scope of what is claimed.

What is claimed is:—

1. In a gasolene apparatus for automobiles, a tank adapted to be arranged beneath the front seat thereof, a filling tube connected with said tank and including a horizontal portion and a vertical portion, the latter being arranged adjacent one side of the machine, an indicating device including a tube disposed in juxtaposition to said vertical portion of the filling tube, means connecting said tubes together, an arcuate-shaped graduated plate carried by the filling tube adjacent the receiving end thereof and overlying the adjacent end of the second mentioned tube, and a movable pointer arranged to cooperate with said plate for the purpose specified.

2. In a gasolene apparatus for automobiles, a tank adapted to be arranged beneath the front seat thereof, a filling tube connected with said tank and including a horizontal portion and a vertical portion, the latter being disposed adjacent one side of the machine, an indicating device connected with said tank and including a tube arranged in juxtaposition to the vertical portion of the filling tube, attaching lugs projecting from the opposed sides of the filling tube adjacent the upper end thereof, an apertured lug projecting from said tube at the point of juncture of the vertically and horizontally disposed portions, a lug projecting from the tube of said indicating device and arranged to overlap the latter mentioned lug of the filling tube, a fastening element passed through said overlapped lugs, whereby the filling tube assists in supporting the tube of the indicating device, an arcuate-shaped graduated plate carried by the filling tube adjacent the receiving end thereof and overlying the adjacent end of the second mentioned tube, and a movable pointer arranged to co-operate with the said plate for the purpose specified.

In testimony whereof I affix my signature.

HERMAN CUSTER.